United States Patent [19]
Kragl et al.

[11] Patent Number: 5,475,519
[45] Date of Patent: Dec. 12, 1995

[54] INTEGRATED-OPTICAL CIRCUIT AND HEAD STATION FOR AN INTEGRATED-OPTICAL CIRCUIT

[75] Inventors: Hans Kragl, Ober-Ramstadt; Wolf-Henning Rech, Griesheim; Jens Weber, Bad Solden, all of Germany

[73] Assignee: Robert Bosch GmbH, Stuttgart, Germany

[21] Appl. No.: 162,725

[22] Filed: Dec. 3, 1993

[30] Foreign Application Priority Data

Dec. 3, 1992 [DE] Germany ............. 42 40 627.7

[51] Int. Cl.⁶ ............................................. H04B 10/14
[52] U.S. Cl. ................ 359/168; 359/126; 359/169; 359/170; 359/173
[58] Field of Search ............................. 359/126, 168, 359/169, 170, 173; 385/24

[56] References Cited

U.S. PATENT DOCUMENTS

| | | | |
|---|---|---|---|
| 4,642,804 | 2/1987 | Personick | 359/168 |
| 4,742,576 | 5/1988 | McMahon | 359/126 |
| 4,759,011 | 7/1988 | Hicks | 359/126 |
| 4,775,971 | 10/1988 | Bergmann | 359/168 |
| 5,054,873 | 10/1991 | Davis et al. | 385/27 |

FOREIGN PATENT DOCUMENTS

| | | | |
|---|---|---|---|
| 0496348 | 7/1992 | European Pat. Off. | |
| 4038654 | 6/1991 | Germany | |
| 8500484 | 1/1985 | WIPO | 359/126 |
| 8702531 | 4/1987 | WIPO | 359/169 |

OTHER PUBLICATIONS

"Electrooptic–Distributed Bragg–Reflection Modulators for Integrated Optics"; Jyong Chi An et al.; IEEE Journal of Quantum Electronics, vol. QE–13, No. 4, Apr. 1977, pp. 206–208.

"Polarization and Wavelength Multiplexed Bidirectional Single Fiber Subscriber Loop"; H. Heidrich et al.; Journal of Optical Communications, (1986) Dec., No. 4, pp. 136–138.

"FSK with Direct Detection In Optical Multiple–Access FDM Networks", by Ivan P. Kaminow in I.E.E.E. Journal on Selected Areas in Communications, vol. 8, No. 6 Aug. 1990, pp. 1005–1014.

"Theory of Cascaded Quarter Wave Shifted Distributed Feedback Resonators", by Hermann A. Haus and Y. Lai in I.E.E.E. Journal of Quantum Electronics, vol. 28, No. 1, Jan. 1992 pp. 205–213.

"Pigtailed Single–Mode Fiber Optic Light Modulator in Silicon", by Solgaard, Godil, Hemenway, and Bloom in I.E.E.E. Photonics Technology Letters, vol. 2, No. 9, Sep. 1990, pp. 640–642.

"Application of Coherent Optical Techniques To Broadband Networks" by G. R. Hill and I. W. Stanley in Optical Engineering, vol. 26, No. 4, Apr. 1987, pp. 349–353.

"Narrow–Band Optical Channel–Dropping Filter" by Hermann A. Haus and Y. Lai in Journal of Lightwave Technology, vol. 10, No. 1, Jan. 1992, pp. 57–62.

"A Polarization–Independent Silicon Light Intensity Modulator for 1.32 um Fiber Optics" by B. R. Hemenway, O. Solgaard, A. A. Godil and D. M. Bloom in I.E.E.E. Photonics Technology Letters, vol. 2, No. 4, Apr. 1990, pp. 262–264.

Primary Examiner—Leslie Pascal
Attorney, Agent, or Firm—Kenyon & Kenyon

[57] ABSTRACT

An integrated-optical circuit receives optical signals and modulates and reflects incoming optical signals. The integrated-optical circuit includes a light guide with at least one Bragg resonator evanescently coupled to light guides and a photocell coupled to a Bragg resonator as well as a modulating device that modulates and reflects an additional optical signal that is received.

19 Claims, 2 Drawing Sheets

INTEGRATED-OPTICAL CIRCUIT AND HEAD STATION FOR AN INTEGRATED-OPTICAL CIRCUIT

BACKGROUND OF THE INVENTION

The present invention relates to an integratedoptical circuit having a Bragg resonator evanescently coupled to a light guide and a photocell coupled to the Bragg resonator, and adapted to receive an optical signal transmitted in the light guide.

The article, Ivan P. Kaminow "FSK with direct detection in optical multiple-access FDM networks," *I.E.E.E. Journal on Selected Areas in Communications*, Volume 8, No. 6, pp. 1005–1014, (August 1990) discusses a non-coherently detecting optical network in which optical signals travel from a transmitter to a receiver. At the receiver, the optical signals are noncoherently detected and demodulated. To send signals back to the transmitter using the receiver, a laser is provided and transmits optical signals from the receiver to the transmitter. In addition, a star coupler is provided to connect several transmitters and several receivers.

Unpublished German Patent Application No. 41 42 922.2 also discusses providing an integrated-optical circuit for optical transmission systems in which a frequency multiplex method is employed and in which light of different frequencies are simultaneously conducted in a glass fiber. The circuit includes Bragg resonators coupled to a waveguide and photodiodes coupled to the Bragg resonators. This arrangement decouples and detects optical signals evanescently. The Bragg resonator described is suitable both as a frequency-selective modulator on the transmitter side and as a frequency-selective receiver and demodulator. For modulation/demodulation, the refractive index in the vicinity of the resonator is changed using the electro-optical effect.

The article, Hermann A. Haus, "Theory of Cascaded Quarter wave Shifted Distributed Feedback Resonators," *I.E.E.E. Journal of Quantum Electronics*, Volume 28, No. 1, pp. 205–213 (January 1992), describes the use of several feedback resonators on a light waveguide. These resonators are either evanescently coupled Bragg resonators for reflecting the signal, or are mounted on the light waveguide as a Bragg resonator for transmitting a signal. In addition, the article, O. Solgaard et al., "Pigtailed Single-Mode Fiber Optic Light Modulator in Silicone," *I.E.E.E. Photonics Technology Letters*, Volume 2, No. 9, pp. 640–642 (September 1990), describes a reflection modulator which electrooptically modulates and reflects an incoming signal.

Unfortunately, each of the above devices requires an active transmitting element such as a laser to transmit signals to a receiver. As a consequence, additional space and cost is required. Therefore, there is a need for an integrated-optical circuit in which optical modulated signals can be received and then transmitted without requiring an active transmitting element.

SUMMARY OF THE INVENTION

The integrated-optical circuit according to the present invention advantageously permits optical modulated signals to be received and then transmitted without requiring an active transmitting element such as a laser. The present invention does so by providing a modulating device which modulates and reflects an additional optical signal received by the modulating device. Hence, the present invention advantageously saves space since the integrated-optical circuit of the present invention does not need a transmitting laser. In addition, the present invention provides an extremely economical solution to the above mentioned problem of the prior art devices since only one transmitting laser is needed to supply an optical signal to be modulated and reflected in the receiver in a system having a plurality of subscribers. The failure probability and maintenance cost in the device of the present invention are significantly decreased as a result.

By permitting the mounted Bragg resonator to be thermo-optically tuned, variable yet easily created adjustability of the resonant frequency can be advantageously achieved with the present invention. By proving a plurality of Bragg resonators, each being tuned to different frequencies, the integrated-optical circuit of the present invention can suitably transmit optical signals in frequency multiplex. In addition, the present invention provides a space-saving design for a receiver, since only an integrated-optical circuit for receiving many channels is required.

By designing the integrated-optical circuit for receiving broadband and narrowband signals, the integrated-optical circuit of the present invention advantageously permits telephone signals to be received while simultaneously operating as a bi-directionally connected telephone channel subscriber. A head station for the integrated-optical circuit can therefore be used as a combined transmitter and receiver for television and telephone signals, for example. By interposing a star coupler between the head station and receivers, the present invention provides an additional cost savings since many receivers can be reached by only one head station and at the same time signals for many receivers can be received at one head station.

DETAILED DESCRIPTION

Figure 1:
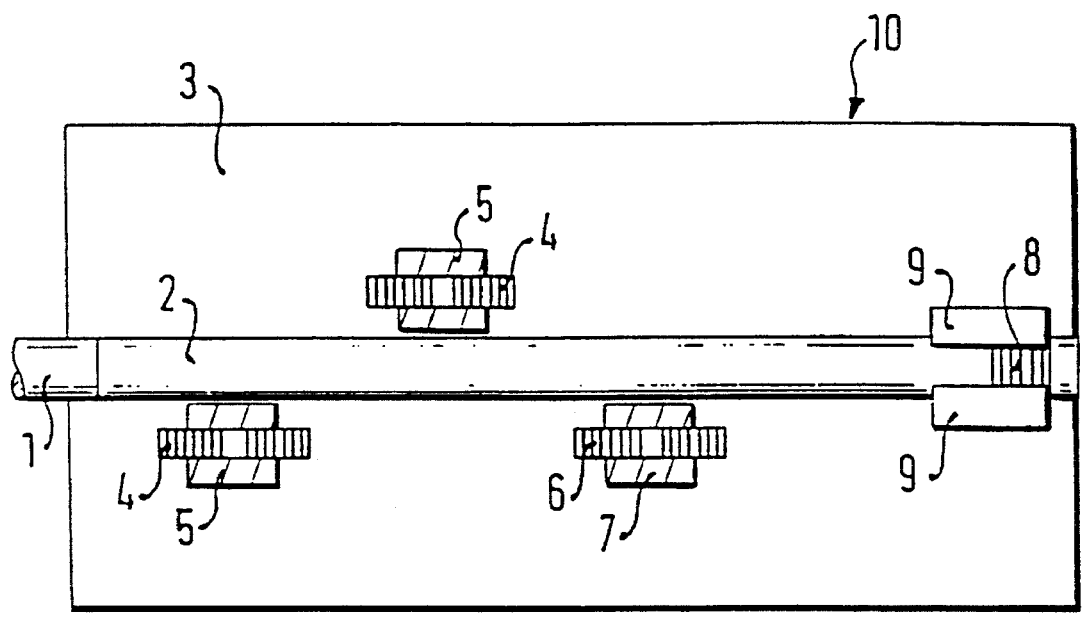
FIG. 1 is a schematic diagram of an integrated-optical circuit with a mounted Bragg reflector.

FIG. 1 is a schematic diagram of an integrated-optical circuit according to the present invention. A light guide includes a glass fiber 1 and a light waveguide 2 continuing the path of glass fiber 1. The light waveguide 2 is embedded in a substrate 3. On either side of light waveguide 2 is an evanescently coupled Bragg resonator 4, to which a photocell 5 is coupled. In addition, another evanescently coupled Bragg resonator 6 with another photocell 7 is disposed on one side of light waveguide 2. Further, an electro-optically tunable Bragg reflector 8 is mounted on the light waveguide 2 and includes control electrodes 9.

The light waveguide 2 is formed of a polymer having a higher index of refraction than that of substrate 3. At least in the area of the mounted electro-optically tunable Bragg reflector 8, the light waveguide 2 is formed of a NLO (NonLinearly Optical) polymer, whose refractive index can be changed by an electrical field.

Light guided in the glass fiber 1 enters the light waveguide 2. The light contains optical signals at many frequencies. Bragg resonators 4, 6 are each designed for a single resonant frequency and dimensioned accordingly. Evanescent coupling to light waveguide 2 means that the optical signal is detected precisely with the resonant frequency of Bragg resonator 4, 6 from photocell 5, 7 coupled to Bragg resonator 4, 6, and reflected back from Bragg resonator 4, 6 in a direction opposing the incoming optical signal.

Providing several Bragg resonators 4, 6 permits a spectrum of several different frequencies to be detected by one integrated-optical circuit. After the intensity of optical signal has been modulated by the electrical field of control electrodes 9, the electro-optically tunable Bragg reflector 6 mounted on light waveguide 2 reflects the optical signal that has the same frequency as the reflecting frequency of the electro-optically tunable Bragg reflector 8.

Figure 2:
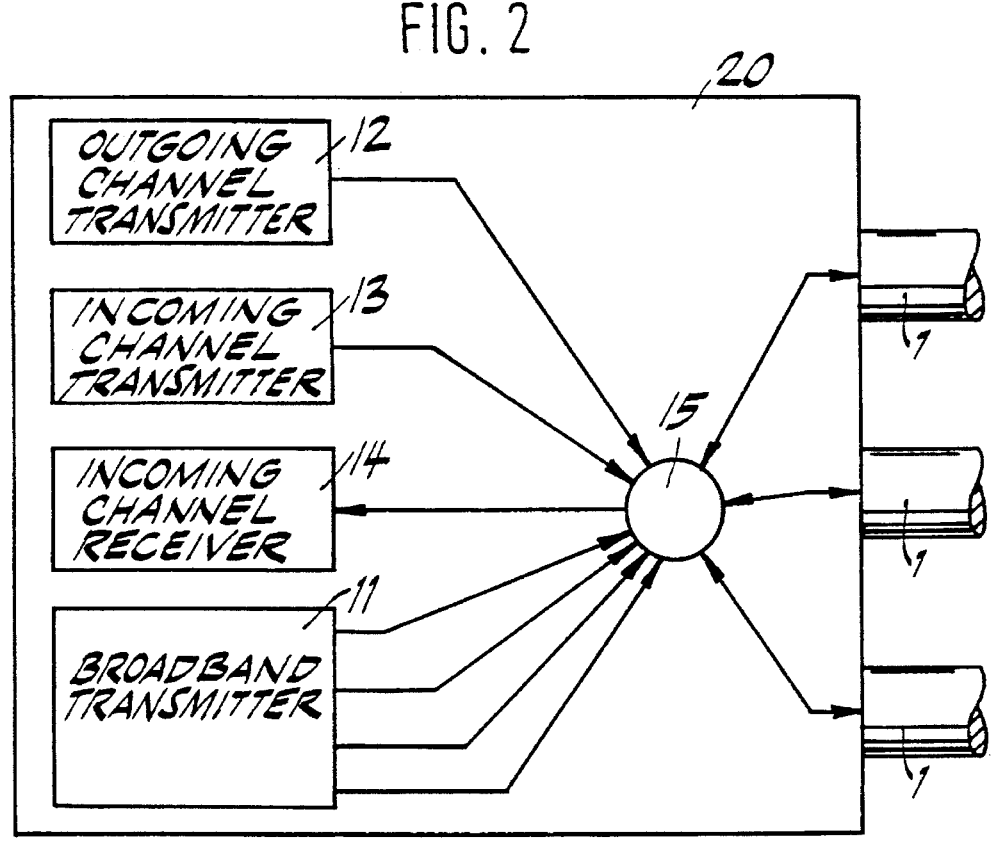
FIG. 2 is a head station for an integrated-optical circuit.

FIG. 2 shows a head station adapted to control an integrated-optical circuit according to the present invention. Head station 20 comprises a broadband transmitter 11 which is adapted to emit several optical broadband signals of different frequencies. In addition, an outgoing-channel transmitter 12 as well as an incoming channel transmitter 13 are provided. Transmitters 11, 12, and 13 as well as an incoming channel receiver 14 are connected to one side of a star coupler 15. A plurality of glass fibers 1 are connected on the other side of the star coupler 15.

Broadband transmitter 11 transmits optical broadband signals of different frequencies via star coupler 15 to glass fibers 1. A receiver in the form of the integrated-optical circuit according to the present invention can be coupled with each of the glass fibers 1. Outgoing-channel transmitter 12 transmits an optical narrow-band signal as the incoming-channel signal to star coupler 15. Incoming-channel transmitter 13 likewise transmits an optical unmodulated signal to star coupler 15, from which all of the optical signals fed by transmitters 11, 12, 13 are delivered to glass fibers 1.

Optical broadband signals may include television signals, for example. The incoming-channel signal can be a transmission channel for a telephone link, for example. The optical unmodulated signal of incoming-channel transmitter 13 passes through one of the glass fibers 1 to the integrated-optical circuit, at which this incoming-channel signal is modulated and reflected. The reflected incoming-channel signal goes back through the glass fiber 1 to incoming-channel receiver 14 via the star coupler 15. At the incoming channel receiver 14, the reflected signal can be demodulated. The reflected incoming-channel signal can be another transmitting channel of the telephone link for example. In this way, bi-directional exchange of optical signals is possible without an active transmitting device, such as for example a laser, at the subscriber station, which contains the integrated-optical circuit.

Figure 3:
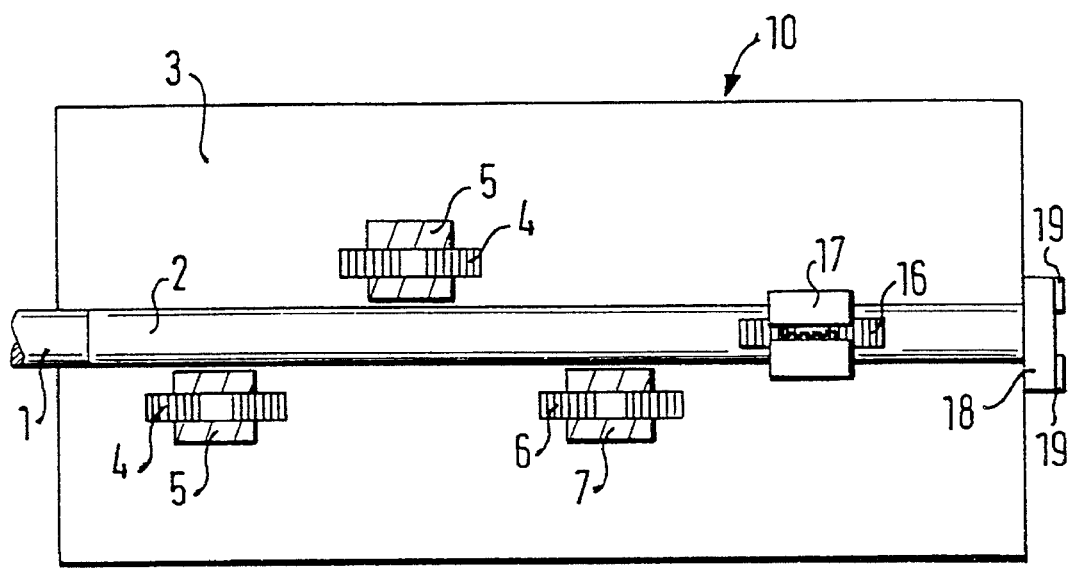
FIG. 3 is a schematic diagram of an integrated-optical circuit with a mounted Bragg resonator and a reflection modulator.

FIG. 3 shows another embodiment of an integrated-optical circuit of the present invention. The integrated-optical circuit in FIG. 3 differs from the embodiment of the integrated-optical circuit shown in FIG. 1 in that it includes a Bragg resonator 16 which is mounted on light waveguide 2 and also includes a "Thermoaktor" 17 with a meander-shaped heating wire in place of the Bragg reflector 8 and control electrodes 9. In addition, a reflection modulator 18 with control terminals 19 is provided on the end of light waveguide 2. The Bragg resonator 16 is thermo-optically tunable by the "Thermoaktor" 17. The light waveguide 2 is formed of a linearly optical polymer.

As a result of ohmic heat release in the immediate vicinity of light waveguide 2 under the control of "Thermoaktor" 17, the index of refraction of the polymer of light waveguide 2 located beneath the Bragg resonator 16 can be varied thermo-optically. As a result, the resonant frequency of the mounted Bragg resonator 16 varies as well. Thus, the frequency allowed to pass by the mounted Bragg resonator 16 can be adjusted thermo-optically. That is, the frequency of the optical unmodulated signal is filtered through mounted Bragg resonator 16. This bandpass-filtered optical unmodulated signal reaches reflection modulator 18 and its reflection can be varied electro-optically by means of control terminals 19. Hence, an intensity-modulated reflection signal is produced and passes, as a reflected incoming-channel signal, back through glass fiber and star coupler 15 to incoming-channel receiver 14.

Figure 4:
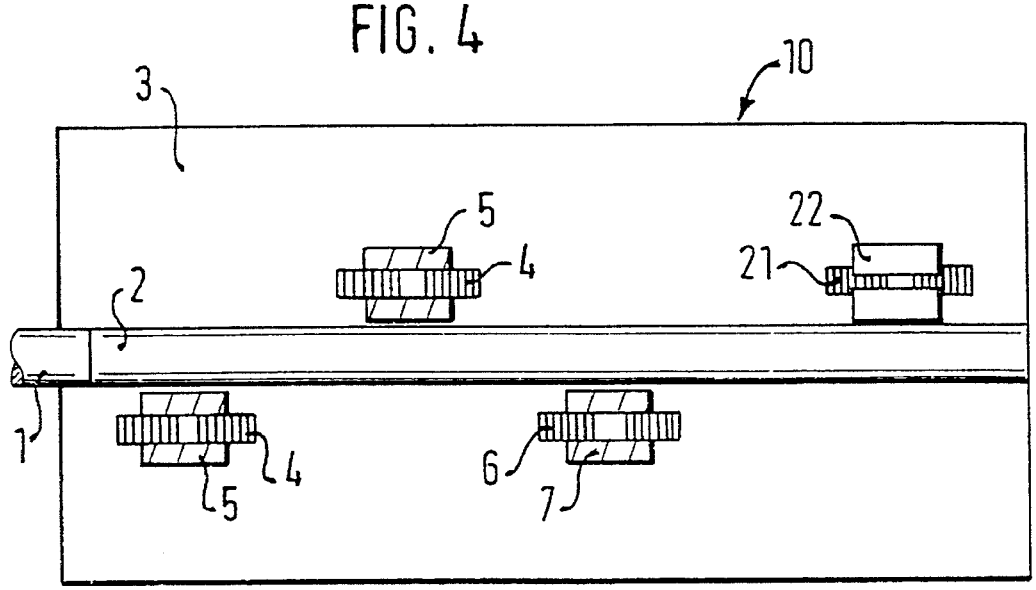
FIG. 4 is a schematic diagram of an integrated-optical circuit with an evanescently coupled Bragg resonator.

FIG. 4 shows yet another embodiment of the integrated-optical circuit of the present invention. This embodiment differs from the embodiment of integrated-optical circuit shown in FIG. 1 in that an evanescently coupled electro-optically tunable Bragg resonator 21 with electrical terminals 29 is provided on the light waveguide 2 instead of an electro-optically tunable mounted Bragg reflector 8 and control electrodes 9. Here, the light waveguide 2 is formed of a linear-optical polymer in the area of evanescently coupled electro-optically tunable Bragg resonator 21. The Bragg resonator 21 must be made of a NLO polymer.

As a result of evanescent coupling to light waveguide 2, evanescently coupled electro-optically tunable Bragg resonator 21 reflects the frequency precisely corresponding to its resonant frequency. By generating an electrical field by means of electrical terminals 22, the refractive index of the nonlinearly optical polymer of the evanescently coupled electro-optically tunable Bragg resonator 21 may be changed. In this way, the intensity of the optically unmodulated signal can also be modulated and then reflected with the resonant frequency of the evanescently coupled electro-optically tunable Bragg resonator 21. The intensity-modulated reflected signal again reaches incoming-channel receiver 14 as a reflected incoming-channel signal.

Connecting several integrated-optical circuits in series with a new glass fiber 1 being coupled to light waveguide 2, in which the fiber is able to follow additional integrated-optical circuits with glass fibers 1 located therebetween, is also possible with the integrated-optical circuits shown in FIGS. 1 and 4.

A network with a plurality of integrated-optical circuits is advantageously operated using a network protocol which assigns time windows to individual subscribers during which each subscriber transmits its optical response signal to the receiver.

What is claimed is:

1. An integrated-optical circuit for receiving at least one optical signal transmitted in a light guide comprising:

a) a Bragg resonator, said Bragg resonator being evanescently coupled with the light guide;

b) a photocell, said photocell being coupled with said Bragg resonator; and c) a modulating device, said modulating device being adapted to modulate and reflect an additional optical signal that is received by the integrated-optical circuit.

2. The integrated-optical circuit of claim 1 wherein said modulating device is an electro-optically tunable Bragg reflector mounted on the light guide.

3. The integrated-optical circuit of claim 2 further comprising:

d) at least one further Bragg resonator being evanescently coupled with the light guides; and e) at least one further photocell coupled with said at least one further Bragg resonator, wherein each of said at least one further Bragg resonator is tuned to a different frequency whereby a plurality of optical signals having different frequencies transmitted in the light guides are decouplable from said at least one further Bragg resonator.

4. The integrated-optical circuit of claim 3 wherein said at least one further Bragg resonator is adapted to decoupled both broardband and narrowband signals and wherein said modulating device is adapted to modulate and reflect a narrowband signal.

5. The integrated-optical circuit of claim 2 wherein said Bragg resonator is adapted to decoupled a broadband signal and wherein said modulating device is adapted to modulate and reflect a signal with a low data rate.

6. The integrated-optical circuit of claim 1 wherein said modulating device is an electro-optically tunable Bragg resonator evanescently coupled to the light guide.

7. The integrated-optical circuit of claim 6 further comprising:
   d) at least one further Bragg resonator being evanescently coupled with the light guides; and
   e) at least one further photocell coupled with said at least one further Bragg resonator, wherein each of said at least one further Bragg resonator is tuned to a different frequency whereby a plurality of optical signals having different frequencies transmitted in the light guides are decouplable from said at least one further Bragg resonator.

8. The integrated-optical circuit of claim 7 wherein said at least one further Bragg resonator is adapted to decouple both broadband and narrowband signals and wherein said modulating device is adapted to modulate and reflect a narrowband signal.

9. The integrated-optical circuit of claim 6 wherein said Bragg resonator is adapted to decouple a broadband signal and wherein said modulating device is adapted to modulate an reflect a signal with a low data rate.

10. The integrated-optical circuit of claim 1 wherein said modulating device includes:
    i) a Bragg resonator mounted on the light guide; and
    ii) a reflection modulator located on an extension of the light guide following said mounted Bragg resonator of said modulating device.

11. The integrated-optical circuit of claim 10 wherein said mounted Bragg resonator of said modulating device is thermo-optically tunable.

12. The integrated-optical circuit of claim 10 further comprising:
    d) at least one further Bragg resonator being evanescently coupled with the light guides; and
    e) at least one further photocell coupled with said at least one further Bragg resonator, wherein each of said at least one further Bragg resonator is tuned to a different frequency whereby a plurality of optical signals having different frequencies transmitted in the light guides are decouplable from said at least one further Bragg resonator.

13. The integrated-optical circuit of claim 12 wherein said at least one further Bragg resonator is adapted to decouple both broadband and narrowband signals and wherein said modulating device is adapted to modulate and reflect an narrowband signal.

14. The integrated-optical circuit of claim 10 wherein said Bragg resonator is adapted to decouple a broadband signal and wherein said modulating device is adapted to modulate and reflect a signal with a low data rate.

15. The integrated-optical circuit of claim 1 further comprising:
    d) at least one further Bragg resonator being evanescently coupled with the light guides; and
    e) at least one further photocell coupled with said at least one further Bragg resonator,
    wherein each of said at least one further Bragg resonator is tuned to a different frequency whereby a plurality of optical signals having different frequencies transmitted in the light guides are decouplable from said at least one further Bragg resonator.

16. The integrated-optical circuit of claim 15 wherein said at least one further Bragg resonator is adapted to decouple both broadband and narrowband signals and wherein said modulating device is adapted to modulate and reflect a narrowband signal.

17. The integrated-optical circuit of claim 1 wherein said Bragg resonator is adapted to decouple a broadband signal and wherein said modulating device is adapted to modulate and reflect a signal with a low data rate.

18. A system comprising:
    a) an integrated-optical circuit for receiving at least one optical signal transmitted in a light guide and including:
       i) a Bragg resonator, said Bragg resonator being evanescently coupled with the light guide;
       ii) a photocell, said photocell being coupled with said Bragg resonator; and
       iii) a modulating device, said modulating device being adapted to modulate and reflect an additional optical signal that is received by the integrated-optical circuit; and
    b) a head station, said head station adapted to transmit and receive optical signals which travel through the light guide to and from said integrated-optical circuit and including:
       i) a first transmitter adapted to emit the optical signal;
       ii) a second transmitter adapted to transmit an additional optical signal; and
       iii) a receiver adapted to receive the additional optical signal modulated and reflected by said modulating device.

19. The system of claim 18 wherein said head station further includes:
    iv) a star coupler having a first side and a second side wherein said first and second transmitters and said receiver are coupled with said first side, and said light guide is coupled with said second side.

* * * * *